A. NIEDERBERGER.
MIXING MACHINE.
APPLICATION FILED FEB. 28, 1919.

1,350,171.

Patented Aug. 17, 1920.
2 SHEETS—SHEET 1.

Inventor:
Alois Niederberger
BY Oscar Geier
Att'y

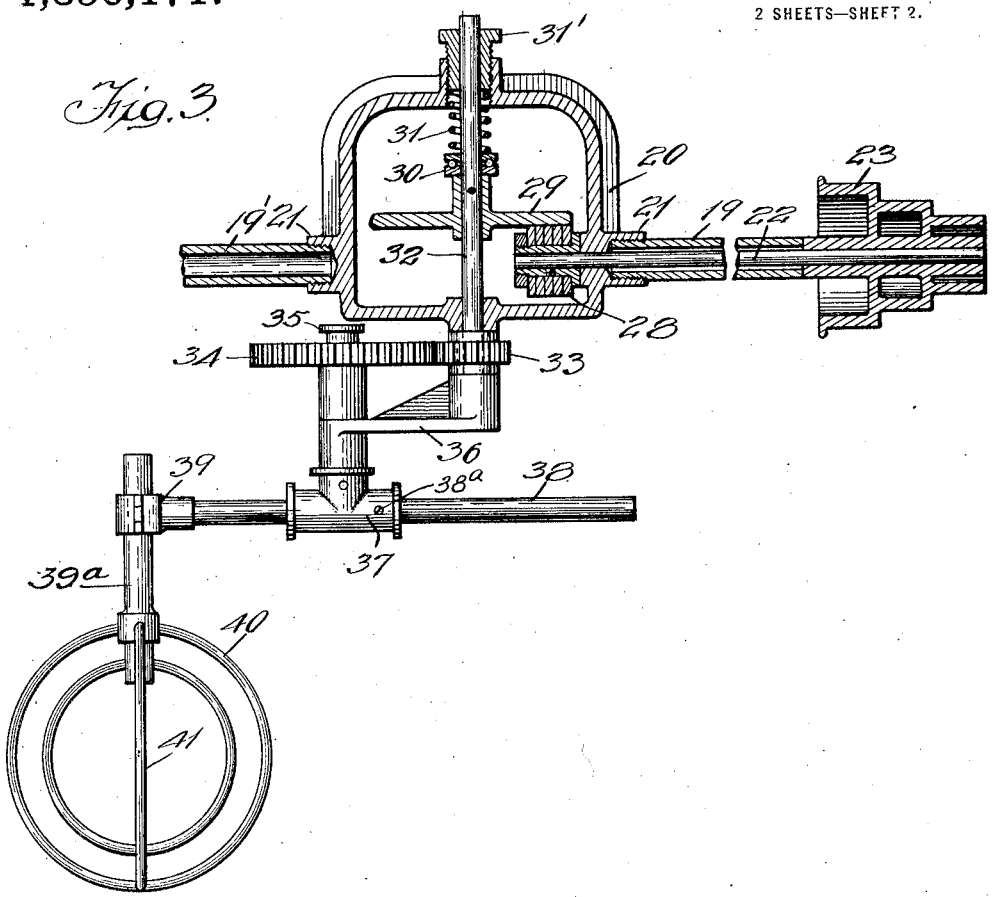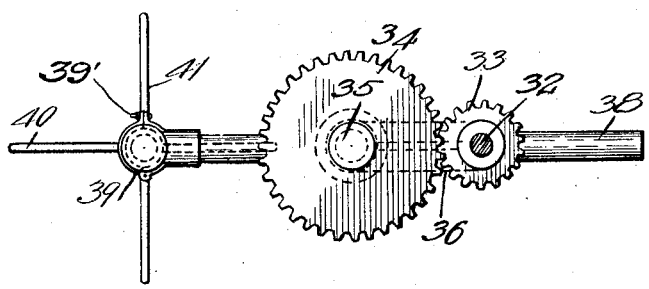

UNITED STATES PATENT OFFICE.

ALOIS NIEDERBERGER, OF ARGYLE, WISCONSIN.

MIXING-MACHINE.

1,350,171.  Specification of Letters Patent.  Patented Aug. 17, 1920.

Application filed February 28, 1919. Serial No. 279,763.

*To all whom it may concern:*

Be it known that I, ALOIS NIEDERBERGER, a citizen of the Republic of Switzerland, residing at Argyle, county of Lafayette, and State of Wisconsin, have invented certain new and useful Improvements in Mixing-Machines, of which the following is a specification.

This invention relates to improvements in machines used in making cheese or other like materials, and has as its principal object the provision of mechanism adapted to agitate, mix, and commingle cheese ingredients.

Another object is to provide such mechanism with a power operating means so arranged that the same can be used upon vats of varying capacity.

These and other similar objects which will become more fully apparent from a consideration of the following description and accompanying drawings, forming a part of this specification, the various novel features of the invention being set forth in detail in the appended claims.

Figure 1 of the drawings is a top view, of a cheese vat with an embodiment of the invention applied thereto.

Fig. 3 is a vertical sectional view on a larger scale taken on line 3—3 of Fig. 1 but omitting the vat.

Fig. 4 is a horizontal sectional view taken on line 4—4 of Fig. 3.

Figure 1:
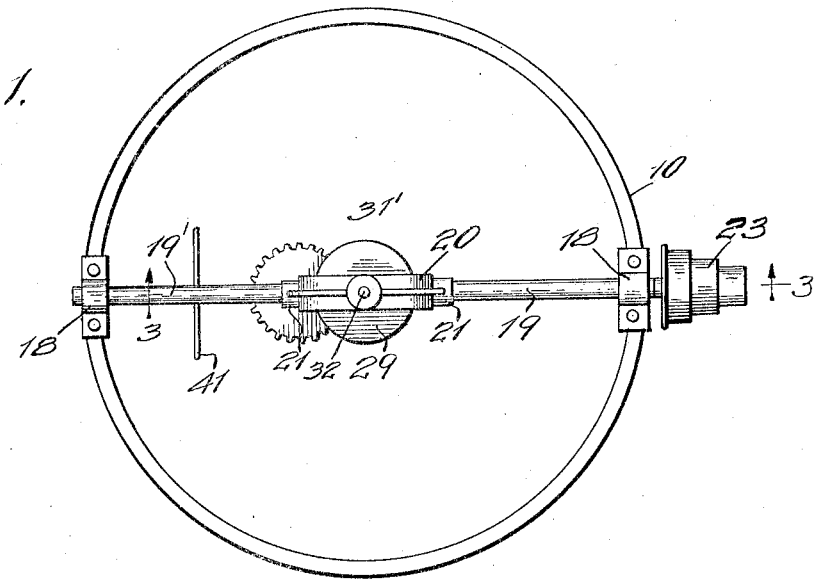
Figure 2:
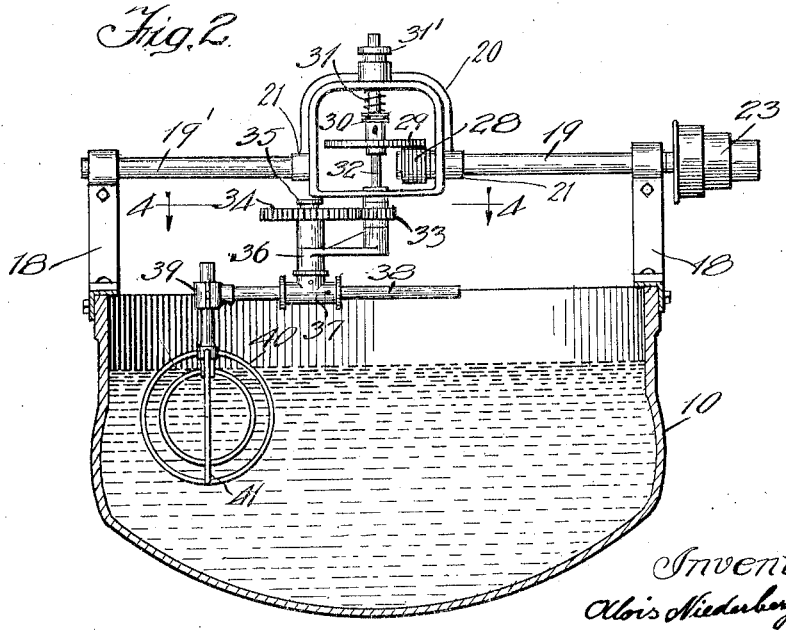
Fig. 2 is a vertical sectional view of the cheese vat with the mixer shown in elevation.

In the present instance my invention is applied to a vat 10 of circular shape in plan view.

Attached at opposite points to the upper edge of the vat are a pair of brackets 18, having the outer ends of a pair of horizontal tubes 19 and 19' adjustably fixed in head 18' formed on the top of the brackets.

These tubes extend diametrically across the vat at some distance above it and their inner ends are securely fastened in the sockets 21 formed on opposite sides of a rectangular frame 20. A horizontal shaft 22 is revolubly mounted in the tube 19, and carries on its projecting outer end a pulley 23, adapted to be driven by a belt from any convenient source of power.

The inner end of the shaft 22 extends through and is journaled in one side of the frame 20, and carries a friction drive roll 28, which engages with a disk 29 mounted between the ends of a vertical shaft 32 extending through the upper and lower members of the frame 20. The disk 29 is pressed against the roll 28 by a coiled spring 31 which bears downwardly thereagainst, an anti-friction bearing 30 being inserted between the lower end of the spring and the disk. The upper end of the spring 31 bears against a nut 31' which is threaded in a suitable boring in the frame 20 and serves as a journal for the upper end of the shaft 32.

The lower end of the shaft 32 passes freely through a spur gear 33 fixed to the underside of the frame 20 and meshing with spur gear 34 carried on the end of a second vertical shaft 35, mounted in the outer end of an arm 36, which is secured to the vertical shaft 32 below the gear 33.

The lower end of the shaft 35 is rigidly engaged in a T-bracket 37 having its horizontally extending portion bored to receive a bar 38, a set screw 38ᵃ being provided whereby the bar may be clamped when disposed in its desired position the T-bracket being set to cause the bar to extend radially of the shaft 32.

Upon the outer end of the bar 38 is fixed a split eye 39 carrying a vertical rod 39ᵃ which may be moved as desired by unscrewing the bolt 39' securing the two halves of the split eye 39 together.

The lower end of the vertical rod 39 has attached to it beater blades 40 and 41, the same being preferably of ring formation as shown.

It will be seen that these beater blades may be raised or lowered by adjusting the vertical shaft and also that the radius of their action is controlled by means of the adjustable bar 38.

In operation, power being applied to the horizontal driving shaft 22, rotary motion is communicated through the friction gears 28 and 29 to shaft 32 causing arm 36 to swing around and moving shaft 35 laterally of itself in a circular path around the shaft 32. By reason of engagement of gear 34 with gear 33 a rotary motion on its own axis is also imparted to shaft 32. Thus two distinct rotating motions are communicated to the beater arms, the proportion of speed being controlled by the difference between the spur gears 33 and 34.

The beaters starting from a position near the inner edges of the vat, are caused to rotate so as to approach the center of the vat and at the same time move circularly within the vat around its inner circumference describing an involute curve having a gyratory path as it advances, thereby moving the beaters in to substantially every part of the vat, as will be evident from the inspection of the drawings.

Having thus described my invention and set forth the manner of its construction, what I claim as new, and desire to secure by Letters Patent is:—

1. In a mixer, a vertical shaft, means for driving said shaft, a horizontal arm fixed at one end to said shaft, a second vertical shaft rotatably carried in the outer end of said arm, means whereby the last mentioned shaft is caused to rotate independently on its own axis when swung around the first mentioned shaft by the said arm, a beater carried by the last mentioned shaft, and means for adjusting said beater toward and away from said last mentioned shaft, said means including a horizontal sleeve fixed upon the lower end of said last mentioned shaft, and an arm mounted in said sleeve to be adjustable longitudinally therein and having the said beater attached to its outer end.

2. In a mixer, a vat, an open rectangular frame adapted to be supported above said vat, a pair of alined horizontal tubes fixed at their inner ends to the sides of said frame and supported at their outer ends by the said vat, a vertical shaft journaled in said frame, a horizontal drive shaft extending at one end through one of the said tubes into the said frame, a pair of engaging gears one of which is carried upon the said end of the horizontal shaft and the other upon the said vertical shaft whereby rotation is imparted to the vertical shaft, and beater mechanism carried by the lower end of the said vertical shaft.

In testimony whereof I have affixed my signature.

ALOIS NIEDERBERGER.